United States Patent [19]

Ripani et al.

[11] Patent Number: 4,620,477
[45] Date of Patent: Nov. 4, 1986

[54] CONTROL SYSTEM FOR CONTROLLING THE PRESSURE ON CHOCOLATE REFINING MACHINE ROLL BEARINGS

[75] Inventors: Sergio Ripani; Giulio Serafini, both of Milan, Italy

[73] Assignee: Carle & Montanari S.p.A., Milan, Italy

[21] Appl. No.: 726,199

[22] Filed: Apr. 22, 1985

[30] Foreign Application Priority Data

May 10, 1984 [IT] Italy .............................. 20863 A/84

[51] Int. Cl.⁴ ............................................ B02C 25/00
[52] U.S. Cl. ........................................ 99/486; 99/485;
100/168; 100/170; 100/176
[58] Field of Search .................. 99/474, 485, 516, 534,
99/452, 460, 487, 486, 489; 426/475, 486, 518,
629; 241/34, 36, 37; 100/43, 47, 68, 168–170,
176; 425/363, 367, 140, 148

[56] References Cited

U.S. PATENT DOCUMENTS

| | | | |
|---|---|---|---|
| 4,299,162 | 11/1981 | Hartmann et al. | 100/170 X |
| 4,480,452 | 11/1984 | Schnyder | 100/170 X |
| 4,485,734 | 12/1984 | Klemmer et al. | 100/168 |
| 4,510,859 | 4/1985 | Berry | 100/47 |
| 4,519,304 | 5/1985 | Ripani | 99/489 |

Primary Examiner—Timothy F. Simone
Attorney, Agent, or Firm—Kalish & Gilster

[57] ABSTRACT

A system for controlling the pressure applied on the roll bearings of chocolate refining machines comprises, in addition to a linked multi-pressure control circuit, an additional circuit for applying linked single-pressure control, a selector valve enabling switching of one or the other of the operating modes.

The dual-function system imparts refining machines with universal operation capabilities.

5 Claims, 1 Drawing Figure

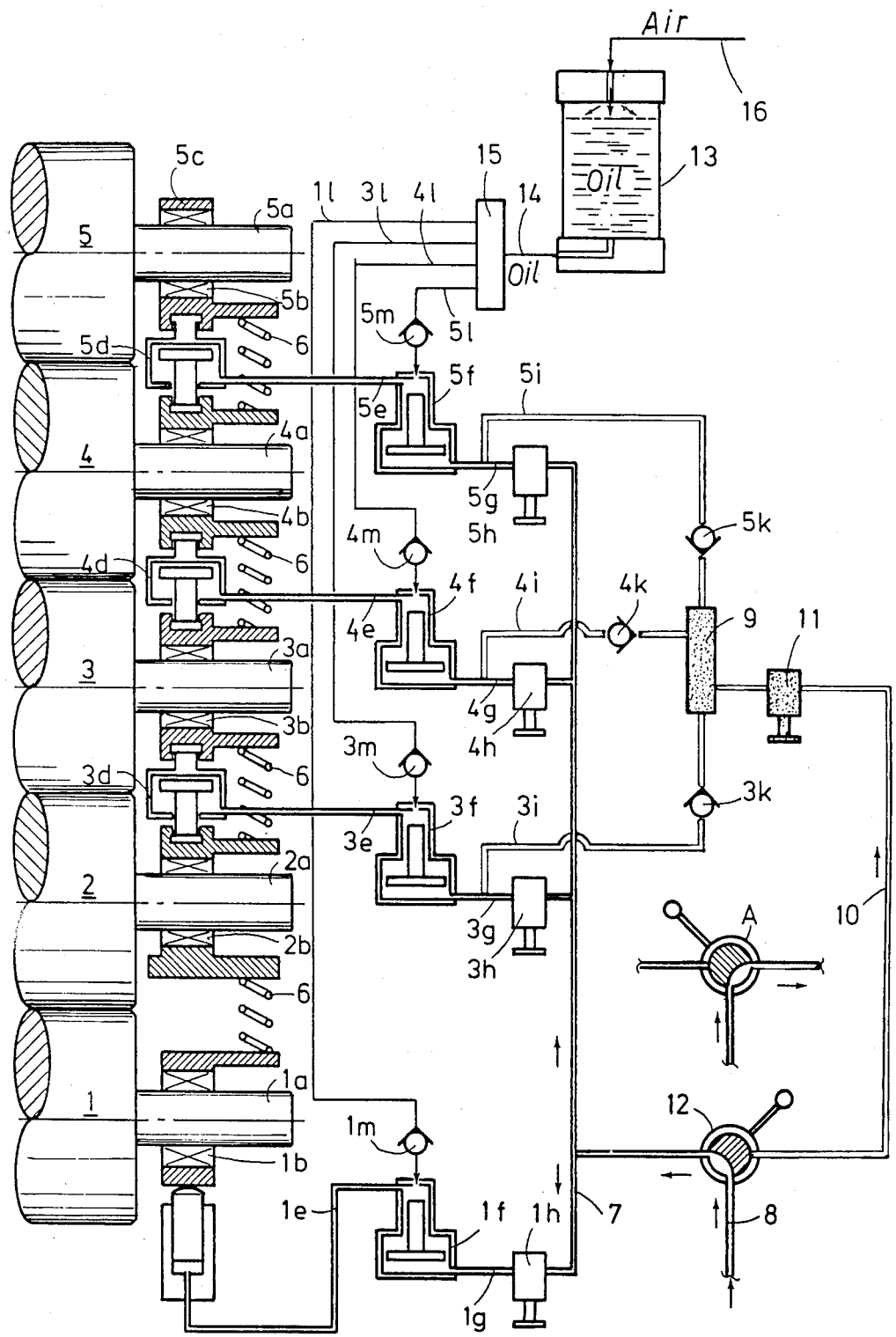

CONTROL SYSTEM FOR CONTROLLING THE PRESSURE ON CHOCOLATE REFINING MACHINE ROLL BEARINGS

BACKGROUND OF THE INVENTION

This invention relates to a control system for controlling the pressure on chocolate refining machine roll bearings.

As is known, chocolate refining machines require that the pressure exerted on the bearings of the refining rolls downstream of the feeding roll pair be adjustable if the machine is to accommodate chocolate pastes having different percentages of fat. Such fat percentages may vary quite significantly, e.g. within a range up to 4-5%, depending on the chocolate products to be prepared from such pastes.

As is known, by controlling the pressure on the refining roll bearings, the plasticity of the chocolate film delivered can be changed.

Currently in use are two different methods of determining a pressure change on the bearings of refining rolls downstream of the feeding pair.

With a first method, the pressure on each roll pair can be changed such that the refining machine is imparted with maximum flexibility to accommodate chocolate pastes whose fat contents vary within the broadest range. To carry out this kind of adjustment, termed "linked multi-pressure control", a control circuit is provided which comprises, for each refining roll, a double-acting hydraulic-pneumatic pressure step-up device which is connected with its hydraulic side to a hydraulic unit associated with the bearings of one refining roll pair, and with its pneumatic side, and through a branch line containing a respective pressure regulator, to a common riser associated with a compressed air source. By operating a pressure regulator, a pressure change is brought about on the bearings of the roll pair served by the respective circuit branch, while the pressure on the bearings of the other refining rolls is kept unaltered. Refining machines equipped with this control system are, accordingly, adapted for processing different chocolate paste types, i.e. for ultimate chocolate products of different types.

With the second method of controlling the refining roll pressure, which consists of acting simultaneously on all the bearings of the refining rolls downstream of the feeding roll pair, the pressure is applied to the bearings of the delivery roll and is transferred by metal-to-metal continuity to the refining rolls downstream of the feeding roll pair. With the latter method, called "linked single-pressure control", pressure can be adjusted in a simpler way than with the "linked multi-pressure control", but such refining machines cannot accept chocolate pastes for refinement which are uneven as regards their fat contents and plasticities.

Thus, currently available are refining machines featuring a more flexible operation, i.e. adapted for processing a range of chocolate pastes, and a more sophisticated and critical adjustment of the refining roll pressures, as well as refining machines which are easier and simpler to adjust but can only accept alike chocolate pastes.

This situation is apt to make the choice of the type of control, or refining machine to be purchased, by the potential user a difficult one.

SUMMARY OF THE INVENTION

It is a primary object of this invention to provide a control system for controlling the pressure on the bearings of chocolate refining machine refining rolls which allows to selectively adopt the "linked multipressure control" or "linked single-pressure control" modes according to the type of chocolate paste to be processed, and specifically by means of an advantageous single switching control.

Moving from a control system of the linked multipressure type, i.e. one comprising, for each refining roll pair located downstream of the feeding roll pair, a double-acting hydraulic-pneumatic pressure step-up device which is connected, with its hydraulic side, to a hydraulic unit associated with the bearings of one roll pair, and with its pneumatic side, to a common riser associated with a source of compressed air, the object of this invention is achieved by that, in the system proposed, downstream of each pressure regulator for the refining rolls located downstream of the feeding roll pair, into each branch line included between one pressure regulator and a pressure step-up device, there opens a branch line from a common adjustment pneumatic circuit which extends from a common manifold connected, with the interposition of a pressure regulator, to a source of compressed air through an operating mode selector valve, also provided being a means of automatically topping up the hydraulic fluid in the hydraulic chambers of the hydraulic-pneumatic pressure step-up devices.

According to the invention, each branch line between the common distributor on the one side, and the branch line included between a pressure regulator and a pressure step-up device, on the other side, includes a check valve.

The hydraulic fluid top-up means for the pressure step-up devices provided by this invention comprises a hydraulic fluid reservoir opening into a distributor, whence a connection line connects said distributor to a hydraulic chamber of said pressure step-up devices, said connection lines having a check valve therein.

According to a further aspect of the invention, the selector valve connects, at one position thereof, the branch line connected to the compressed air source to the riser for that portion of the system which connects to the linked multi-pressure control, whilst said selector valve, at the other position thereof, connects said branch line to the common line of the linked single-pressure control system portion.

Thus, with the system of this invention, a chocolate refining machine may be operated, at the operator's discretion, both with the linked multi-pressure control and linked single-pressure control, depending on the type of the chocolate paste to be processed.

The dual function system proposed has the advantage of having an extremely simple construction and of requiring a limited expenditure of apparata and piping.

A further advantage comes from the great reliability of the system, as well from the great ease of switching between the control modes.

A further advantage of the inventive system is that the filling of the hydraulic chambers of the hydraulic-pneumatic pressure step-up devices with hydraulic fluid is positively ensured.

Another advantage is that the proposed portion of the control system in the linked multi-pressure mode practically requires no additional room, thereby it may be incorporated to existing refining machines equipped with a linked multi-pressure control.

BRIEF DESCRIPTION OF THE DRAWING

Further advantages, details, and features of the control system according to the invention will be apparent from the following description, to be taken in conjunction with the accompanying drawing the single FIGURE whereof schematically illustrates a control system according to the invention for one side of a refining machine the refining rolls and feeding roll pair whereof are shown in a fragmentary way.

On the side of the refining machine not shown in the drawing, the control system of this invention is understood to be a duplicate of its visible side.

DESCRIPTION OF THE PREFERRED EMBODIMENT

In the drawing FIGURE, there are indicated at 1 and 2 two rolls forming the feeding roll pair, and the reference numerals 3,4 and 5 designate the refining rolls proper, of which the roll 5 forms the delivery refining roll.

For simplicity, the film of material between the rolls is not shown. The supported ends of the rolls 1 to 5 have like reference characters with the addition of an "a". The roll bearings have like reference characters with the addition of a "b", while the fixed, i.e. non-rotary, supporting parts for the rolls have like reference characters with a "c" added. The springs interposed between the fixed supports are indicated at 6.

As clearly shown in the drawing, each refining roll 3,4,5 has associated therewith a hydraulic control unit 3d, 4d and 5d, whereinto there open a respective conduit 3e,4e,5e opening, at the other end, into the hydraulic chamber of a pressure step-up device 3f, or 4f and 5f, the pneumatic chamber conduit whereof, 3g,4g and 5g, for said pressure step-up devices 3f,4f and 5f is connected with the interposition of a pressure regulator 3h, 4h, 5h, to a common riser 7 connected to the branch line 8 which connects to a compressed air source.

So far the control system is a linked multi-pressure control known per se.

According to the invention, this linked multi-pressure control system is complemented as described hereinafter to form a dual-function system which also permits a linked single-pressure control. This complementing portion, shown in bold lines, provides for each pressure regulator 3h,4h and 5h a branch line 3i,4i and 5i opening in between said pressure regulators 3h,4h and 5h and associated pressure step-up devices 3f,4f and 5f at one end, and into a manifold 9 at the other end. A conduit 10 including a pressure regulator 11 leads from the same to the branch line 8 connected to the compressed air source through a selector valve 12. Each branch line 3i,4i and 5i includes, moreover, a check valve 3k,4k and 5k.

By moving the selector valve 12 to one position, as shown in the diagram, the incoming compressed air through the branch line 8 will result in the system operating in the "linked multi-pressure control" mode, i.e. by operating one or more pressure regulators 3h, 4h and 5h, the pressure on the supports of the refining rolls 3,4 and 5 may be varied, and specifically so in the instance of chocolate pastes having different plasticity values or fat matter contents. By contrast, with the selector valve in the position shown in the detail view A, the system will be made to operate in the "linked single-pressure control" mode, i.e. to each of the bearings for the refining rolls 3,4,5 there will be applied the same pressure variation by acting on the common pressure regulator 11. This adjustment will be effected in the instance of chocolate pastes which are relatively alike.

In either cases, the pressure on the roll 1 of the feeding pair will be adjusted separately.

A refining machine equipped with a control system according to the invention may, therefore, be used indifferently with any types of chocolate pastes, the adjustment of the refining rolls being selected and controlled at will by the operator according to the type of chocolate paste being handled, by just operating the selector valve 12. After selecting the control mode, the adjustment proper will be made by manipulating the pressure regulators 3h,4h and 5h for linked multi-pressure control, or manipulating the pressure regulator 11 for the linked single-pressure control mode.

Refining machines equipped with the control system of this invention are thus made universal operation refining machines.

In order to accommodate unavoidable decreases in the amount of hydraulic fluid, preferably oil, in the hydraulic chambers of the pressure step-up devices 3f, 4f and 5f, as due to unavoidable, albeit slight, leakage, according to the invention, a hydraulic reservoir 13 is provided the outlet 14 whereof is connected to a distributor 15, whence a feed conduit 11,31-51 extends which leads to the respective pressure step-up device 1f,3f-5f and opens there into the hydraulic chamber. Indicated at 1m, 3m-5m is a check valve. In the reservoir 13, the oil is subjected to pressure by compressed air from the conduit 16. Thus, the control system of the dual function type of this invention is faultlessly reliable. It may be appreciated from the foregoing that the proposed dual function system effectively achieves its object and affords the cited advantages. In particular, noteworthy are its reliable operation, simplicity of the complementary circuit portion, ease of switching between modes, and the possibility of fitting to existing machines. It should be pointed out that with circuit integration proposed, in the linked single-pressure control mode of operation, the varied pressure value individually affects each bearing of the refining rolls 3-5, and precisely in the same amount, whether transmitted in a independent way or not, similarly to linked single-pressure control modes of known types, through application of a pressure to one roll and propagation of the same in a mechanical fashion.

In practice, all of the individual parts may be replaced with other technically and/or functionally equivalent ones without departing from the protection scope of the inventive concept.

All of the features to be inferred from the description, claims and drawing are regarded as being substantial to this invention, either singly or in any combinations thereof.

We claim:

1. In a chocolate refining machine having a feeding roll pair and more than one refining roll located downstream of said feeding roll pair, each of said refining rolls being supported by bearings, a dual-function control system for controlling the pressure on the refining roll bearings for accomodating chocolate pastes of varying plasticity and fat content comprising a linked multi-pressure control circuit for said refining rolls comprising a hydraulic control unit for acting upon the bearing of each refining roll, a double-acting hydraulic pneumatic pressure step-up device having a hydraulic chamber and a pneumatic chamber, a first pressurized air conduit means connecting the hydraulic chamber of the related step-up device and hydraulic unit, a pneumatic regulator pressure regulator associated with each step-up device, second pressurized air conduit means connecting the hydraulic chamber of the related step-up device and pneumatic pressure regulator, there being a source of pressurized air, third pressurized air conduit means common to each of said pneumatic pressure regulators connecting each of them with said pressurized air source, there being a complementary linked single pressure control circuit for said refining rolls comprising a first hydraulic liquid conduit connected at one end with said second pressurized air conduit means between each pair of related step-up devices and pressure regulators, a hydraulic liquid manifold, each of said first hydraulic liquid conduits being connected at the other ends thereof with said manifold, a liquid pressure regulator, means connecting said hydraulic liquid manifold and said pressure regulator, a second hydraulic liquid conduit connecting said hydraulic liquid pressure regulator with said source of hydraulic liquid, there being a multi-positional selector valve interposed between said source of pressurized air, on the one hand, and the linked multi-pressure control circuit and said linked single pressure control circuit, on the other hand, whereby with said selector valve in one operating mode, said linked multi-pressure control circuit is energized, and with said selector valve disposed in another operating mode, said linked single-pressure control circuit is energized.

2. The invention defined in claim 1 wherein a hydraulic liquid reservoir is provided, individual conduit means interconnecting said reservoir with the hydraulic chamber of each of said step-up devices of said linked multi-pressure control circuit for maintaining a predetermined hydraulic pressure in each such step-up device.

3. The invention defined in claim 2 and further characterized by there being a distributor, means connecting said distributor with said reservoir for flow of liquid from the latter to the former, and said individual conduit means being connected to said distributor.

4. The invention as defined in claim 3 wherein a check valve is provided within each first hydraulic liquid conduit means.

5. The invention as defined in claim 4 wherein a check valve is provided with each individual conduit means between the hydraulic chamber of each pressure step-up device and said distributor.

* * * * *